United States Patent
Sakai et al.

(10) Patent No.: US 9,647,515 B2
(45) Date of Patent: May 9, 2017

(54) BRUSHLESS MOTOR AND FUEL PUMP HAVING A TERMINAL STRUCTURE FOR REDUCING TENSILE FORCES BETWEEN STATOR COILS

(71) Applicant: DENSO CORPORATION, Kariya, Aichi-pref. (JP)

(72) Inventors: Hiromi Sakai, Nukata-gun (JP); Kiyoshi Nagata, Nagoya (JP)

(73) Assignee: DENSO CORPORATION, Kariya (JP)

( * ) Notice: Subject to any disclaimer, the term of this patent is extended or adjusted under 35 U.S.C. 154(b) by 158 days.

(21) Appl. No.: 13/888,885

(22) Filed: May 7, 2013

(65) Prior Publication Data

US 2013/0320788 A1    Dec. 5, 2013

(30) Foreign Application Priority Data

Jun. 1, 2012   (JP) .................................. 2012-125928
Dec. 25, 2012  (JP) .................................. 2012-281368

(51) Int. Cl.

| H02K 11/00 | (2016.01) |
|---|---|
| F04B 17/03 | (2006.01) |
| H02K 3/52 | (2006.01) |
| F04D 5/00 | (2006.01) |
| F04D 13/06 | (2006.01) |
| H02K 11/20 | (2016.01) |

(Continued)

(52) U.S. Cl.
CPC .......... *H02K 11/0094* (2013.01); *F04B 17/03* (2013.01); *F04D 5/002* (2013.01); *F04D 13/06* (2013.01); *H02K 3/522* (2013.01); *H02K 11/20* (2016.01); *H02K 11/33* (2016.01); *H02K 3/28* (2013.01)

(58) Field of Classification Search
CPC .......... H02K 5/22; H02K 5/225; H02K 11/00; H02K 11/0094; H02K 3/28; H02K 3/522; F04B 17/03
USPC ............................................. 310/71; 417/420
See application file for complete search history.

(56) References Cited

U.S. PATENT DOCUMENTS 7,626,303 B2 *  12/2009  Watanabe et al. ..... 310/216.095
7,671,495 B2 *   3/2010  Sahara et al. ................... 310/71
(Continued)

FOREIGN PATENT DOCUMENTS

| JP | 2005-328654 | 11/2005 |
|---|---|---|
| JP | 2010-200575 | 9/2010 |

OTHER PUBLICATIONS

Office Action (2 pages) mailed Apr. 15, 2014, issued in corresponding Japanese Application No. 2012-281368 and English translation (3 pages).

*Primary Examiner* — Dang Le
*Assistant Examiner* — Rashad Johnson
(74) *Attorney, Agent, or Firm* — Nixon & Vanderhye P.C.

(57) ABSTRACT

Relay terminals, which are formed integrally with a W-phase terminal, a V-phase terminal and a U-phase terminal provided radially outside bobbins, connect stator coils and the W-phase terminal, the V-phase terminal and the U-phase terminal. Second connection parts of the relay terminals connected to the coils are provided radially inside the W-phase terminal, the V-phase terminal and the U-phase terminal. Thus distances between the second connection part and the inner wall surface of a housing are increased to maintain insulation between the relay terminals and the housing. Thus the relay terminals are protected from breakage.

11 Claims, 7 Drawing Sheets

(51) Int. Cl.
*H02K 11/33* (2016.01)
*H02K 3/28* (2006.01)

(56) References Cited

U.S. PATENT DOCUMENTS

| | | | | |
|---|---|---|---|---|
| 8,072,112 B2* | 12/2011 | Tao | ................. | H02K 3/28 |
| | | | | 310/179 |
| 8,193,677 B2* | 6/2012 | Murakami | ............ | H02K 3/522 |
| | | | | 310/195 |
| 2003/0201688 A1* | 10/2003 | Yamamura et al. | .......... | 310/216 |
| 2004/0095036 A1* | 5/2004 | Yamamoto | .............. | H02K 3/28 |
| | | | | 310/233 |
| 2006/0208605 A1* | 9/2006 | Aoyama et al. | .............. | 310/264 |
| 2006/0284499 A1* | 12/2006 | Rubbo et al. | ............... | 310/68 D |
| 2007/0086905 A1* | 4/2007 | Nagata et al. | ............ | 417/423.3 |
| 2008/0157610 A1 | 7/2008 | Watanabe et al. | | |
| 2009/0202368 A1* | 8/2009 | Ito | ......................... | F02M 37/08 |
| | | | | 417/410.1 |
| 2009/0256438 A1* | 10/2009 | Ikeda et al. | ..................... | 310/71 |
| 2010/0327680 A1* | 12/2010 | Miyachi et al. | ............... | 310/71 |
| 2011/0175471 A1* | 7/2011 | Marchitto | .............. | H02K 3/521 |
| | | | | 310/71 |
| 2012/0027629 A1* | 2/2012 | Tanahashi et al. | ........ | 417/410.1 |
| 2013/0187513 A1* | 7/2013 | Hashimoto | ............ | H02K 3/522 |
| | | | | 310/215 |
| 2013/0315759 A1* | 11/2013 | Hayakawa | ............... | H02K 3/46 |
| | | | | 417/420 |

\* cited by examiner

FIG. 6 COMPARATIVE EXAMPLE
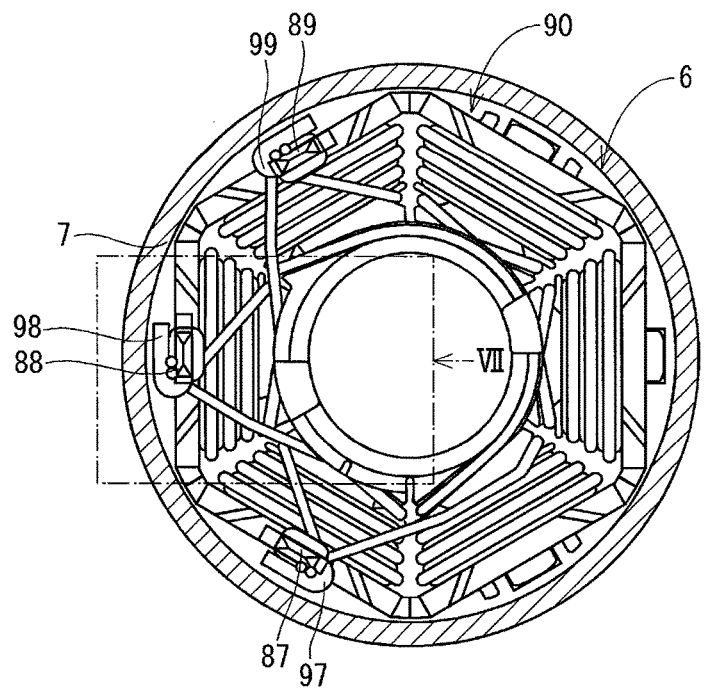
FIG. 7 COMPARATIVE EXAMPLE
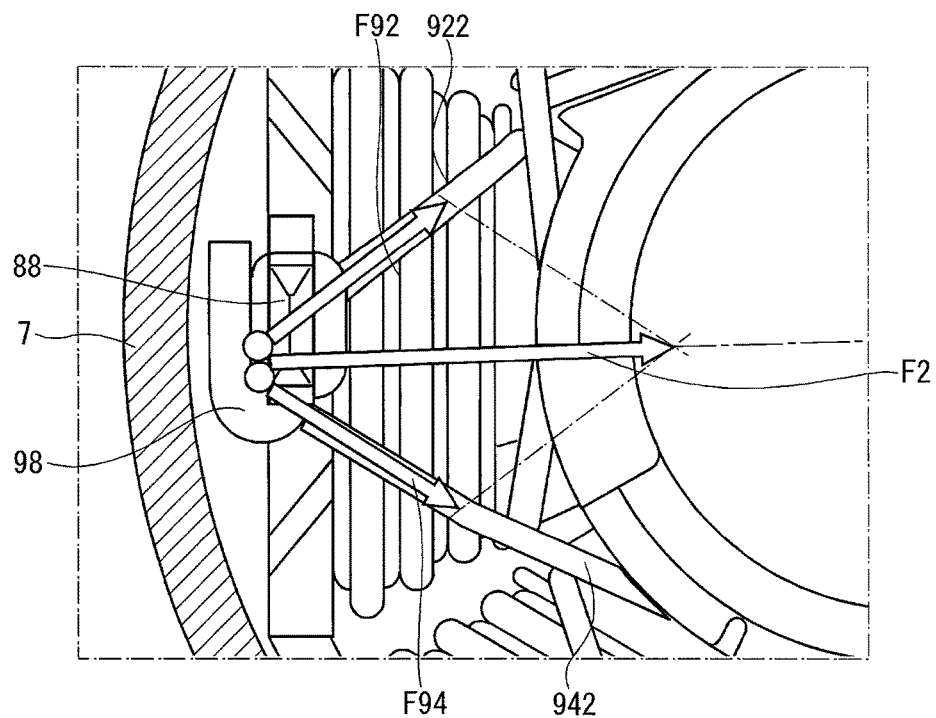

BRUSHLESS MOTOR AND FUEL PUMP HAVING A TERMINAL STRUCTURE FOR REDUCING TENSILE FORCES BETWEEN STATOR COILS

CROSS REFERENCE TO RELATED APPLICATION

This application is based on and incorporates herein by reference Japanese patent applications No 2012-125928 filed on Jun. 1, 2012 and No 2012-281368 field on Dec. 25, 2012.

TECHNICAL FIELD

The present disclosure relates to a brushless motor and a fuel pump using the same.

BACKGROUND

In a conventional brushless motor, a rotor is rotated by controlling power supply to stator coils wound about bobbins of a stator to successively switch over magnetic fields. JP-A-2005-328654 discloses a brushless motor having a restriction part on a relay terminal, which electrically connects a stator coil and a power supply terminal, to restrict the stator coil from being pulled out.

According to the brushless motor described above, there is only a small gap between the relay terminal and an inside wall surface of a housing. When current flows to the relay terminal, electric discharge arises through the small gap between the relay terminal and the housing and tends to break the relay terminal, the stator coil connected to the relay terminal and the power supply terminal.

SUMMARY

It is therefore an object to provide a brushless motor, which is capable of protecting a relay terminal from breaking.

According to one aspect, a brushless motor is formed of a stator and a rotor. The stator includes a plurality of stator cores formed of a magnetic material, a plurality of stator coils wound about the stator cores, a plurality of bobbins covering the stator cores to insulate the stator coils from the stator cores, power supply terminals provided radially outside the bobbins to receive electric power from an external side, and relay terminals connecting electrically the power supply terminals and the stator coils. The stator thus generates a rotating magnetic field when power supply to the coils is controlled. The rotor is provided radially inside the stator and magnetized to opposite magnetic poles alternately in a circumferential direction to be rotated by the rotating magnetic field generated by the stator. The relay terminals include, respectively, first connection parts, which are connected electrically to the power supply terminals, and second connection parts, which are connected electrically to the first connection parts and the stator coils. Each of the second connection parts is provided radially inside the power supply terminal.

BRIEF DESCRIPTION OF THE DRAWINGS

The above and other objects, features and advantages will become more apparent from the following description made with reference to accompanying drawings. In the drawings:

FIG. 6 is a top plan view of a stator of a brushless motor according to a comparative example;

FIG. 7 is an enlarged view of a part VII in FIG. 6;

DETAILED DESCRIPTION OF THE EMBODIMENT

First Embodiment

Figure 1:
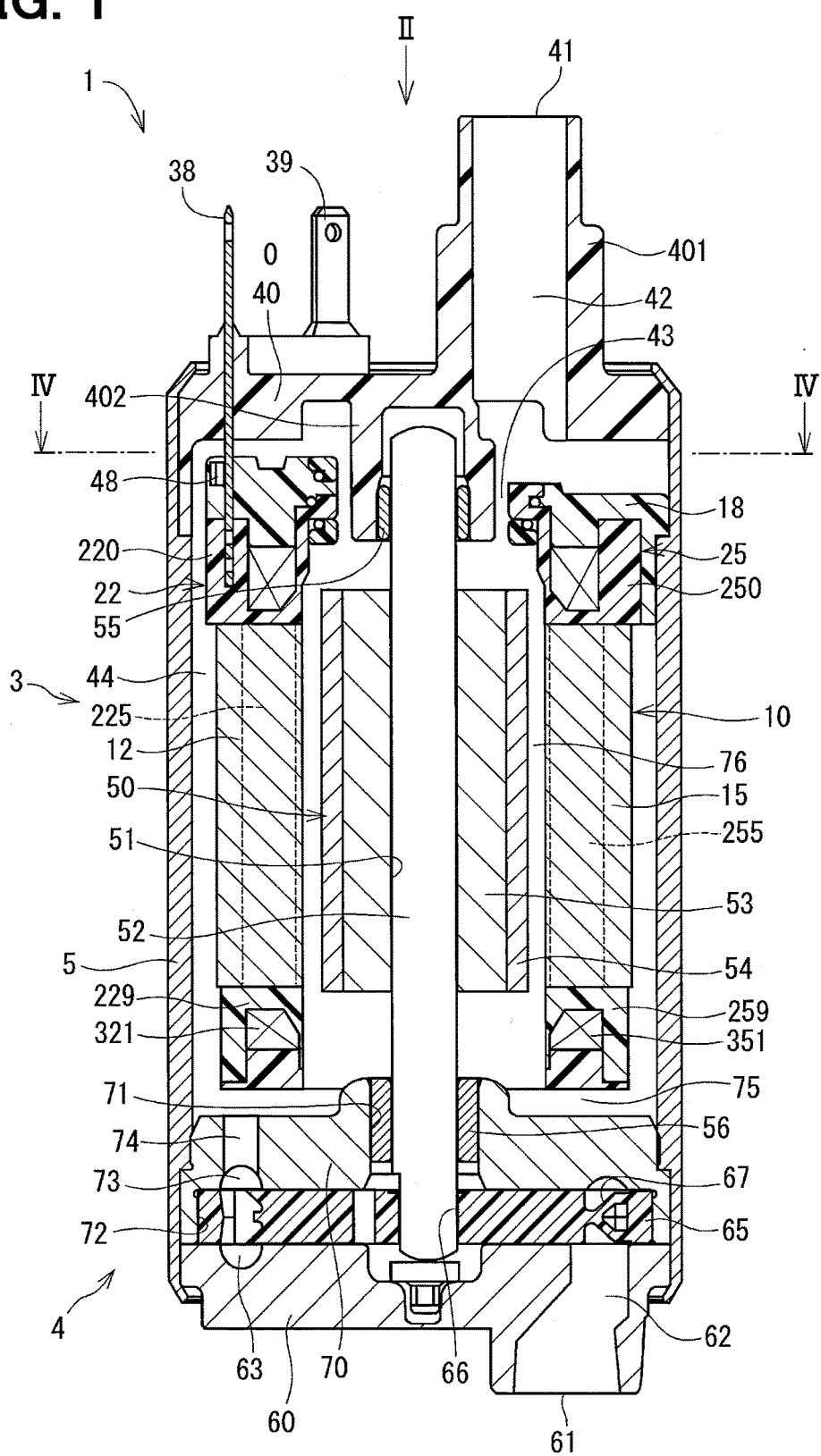
FIG. 1 is a cross-sectional view of a fuel pump using a brushless motor according to a first embodiment.
Figure 2:
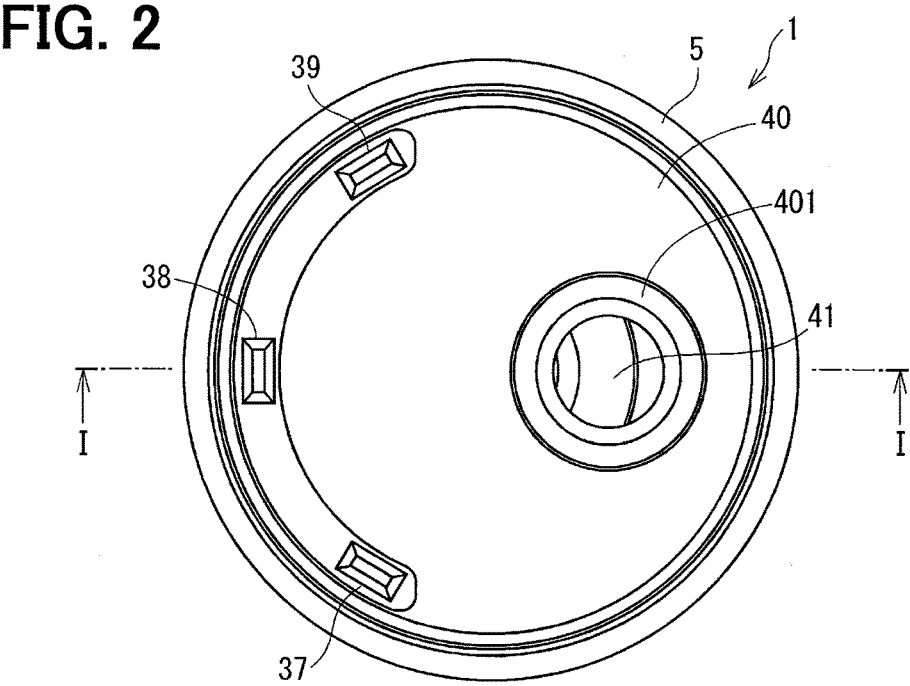
FIG. 2 is a plan view of the fuel pump viewed in a direction II in FIG. 1.

Referring first to FIG. 1 to FIG. 4,

A fuel pump 1 is formed of a motor unit 3, a pump unit 4, a housing 5, a pump cover 60, an end cover 40 and the like. In the fuel pump 1, the motor unit 3 and the pump unit 4 are housed inside a space, which is formed by the housing 5, the pump cover 60 and the end cover 40. The fuel pump 1 suctions fuel in a fuel tank (not shown) from a inlet port 61 and discharges the fuel into an internal combustion engine (not shown) from an outlet port 41.

The housing 5 is formed of a metal such as iron and in a cylindrical shape. The pump cover 60 closes one axial or longitudinal end of the housing 5 at an inlet port 61 side. The pump cover 60 is fixed inside the housing 5 with its fringe at the inlet port 61 side of the housing 5 being crimped inwardly to be restricted from being pulled out in the axial direction.

The end cover 40 is formed of a resin and closes the other axial or longitudinal end of the housing 5 at an outlet port 41 side. The pump cover 40 is fixed inside the housing 5 with its fringe at the outlet port 41 side of the housing 5 being crimped inwardly to be restricted from being pulled out in the axial direction. A tubular part 401 is formed to protrude upward in FIG. 1 on an outside of the end cover 40. The outlet port 41 is formed at one end of the tubular part 401. An outlet passage 42 is formed inside the tubular part 401 and communicated to the output port 41. Inside the end cover 40, a tubular part 402 is formed about a central axis of the housing 5 to extend longitudinally toward a rotor 50 side. A bearing 55 is fitted inside the tubular part 402.

The motor unit 3 is formed of a stator 10, a rotor 50, a shaft 52 and the like. The motor unit 3 is a brushless motor. When electric power is supplied to the stator 10 to generate a rotating magnetic field, the rotor 50 is rotated with the shaft 52.

The stator 10 is formed in a cylindrical shape and housed radially outside part in the housing 5. The stator 10 includes six stator cores, six bobbins, six stator coils, three power supply terminals, three relay terminals and the like. The stator 10 is formed as a single integrated unit by molding these members by resin 18.

Each of six cores is formed by stacking plural numbers of magnetic materials such as iron plates. The six cores are arranged in the circumferential direction to face permanent magnets 54 of the rotor 50. Specifically, as exemplified in FIG. 1, two stator cores 12 and 15 are arranged to face the magnets 54. Four stator cores other than the cores 12 and 15 are similarly arranged to face the magnets 54.

Coil bobbins 21, 22, 23, 24, 25 and 26 are formed of resin material. When each bobbin is formed, a stator core is insert-molded to provide an integral body of the core and the bobbin. Each bobbin is formed of a top end part formed at the outlet port 41 side, an insert part in which the core is inserted, and a bottom end part formed at the inlet port 61 side. Specifically, as shown in FIG. 1, one bobbin 22 is formed of a top end part 220 provided near the end cover 40, a bottom end part 229 provided near the pump unit 4 and an insert part 225 provided between the top end part 220 and the bottom end part 229. Another bobbin 25 is formed of a top end part 250 provided near the end cover 40, a bottom end part 259 provided near the pump unit 4 and an insert part 255 provided between the tope end part 250 and the bottom end part 259. Other bobbins 21, 23, 24 and 26 are configured similarly although not shown.

Figure 3:
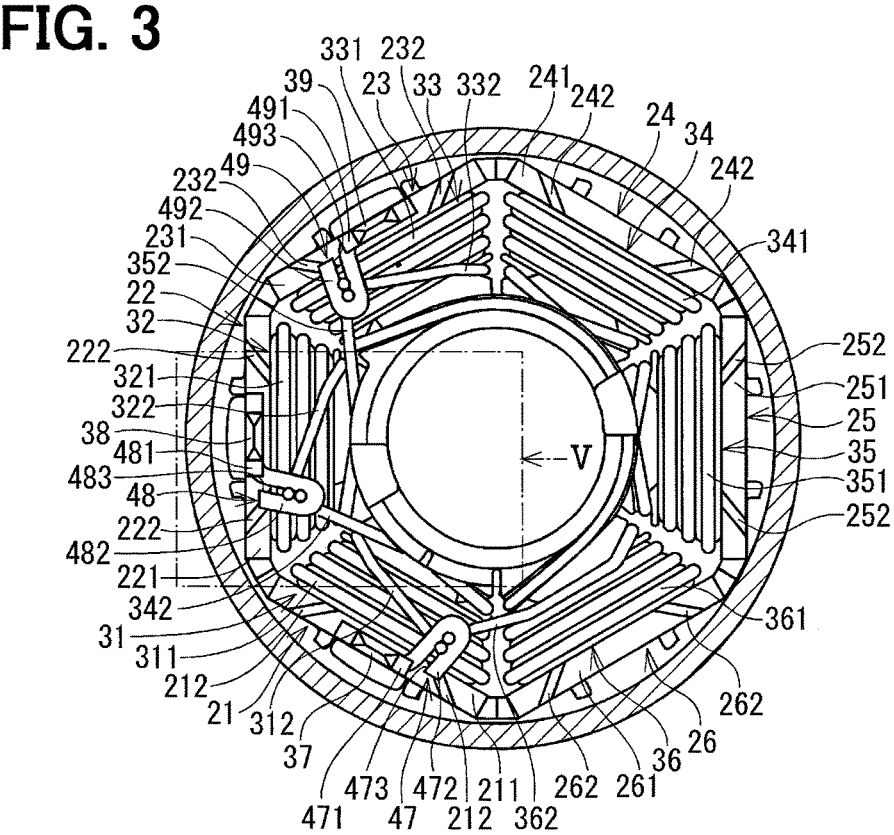
FIG. 3 is a top plan view of a stator of the brushless motor according to the first embodiment.

As shown in FIG. 3, stator coils 31, 32, 33, 34, 35 and 36 are for example copper wires, surfaces of which are covered with insulating films. The coils 31, 32, 33, 34, 35 and 36 include coiled parts 311, 321, 341, 351 and 361 wound about the bobbins 21, 22, 23, 24, 25 and 26, respectively. The coils 31, 32, 33, 34, 35 and 36 further include coils end parts 312, 322, 332, 342, 352 and 362, which are connected to relay terminals 47, 48 and 49 provided as intermediate terminals. The coiled parts 311, 321, 331, 341, 351 and 361 are wound a number of turns about the bobbins 21, 22, 23, 24, 25 and 26, respectively, in the concentrated-winding manner in a clockwise direction in the fuel pump 1, when the bobbins are viewed in the radially outward direction from the radial center of the motor unit 3.

A W-phase terminal 37, a V-phase terminal 38 and a U-phase terminal 39 are press-fitted in annular parts 211, 221 and 231 of the bobbins 21, 22 and 23, respectively, to protrude in the axial direction. Three-phase power is supplied from a power source (not shown) to the W-phase terminal 37, the V-phase terminal 38 and the W-phase terminal 39. The W-phase terminal 37, the V-phase terminal 38 and the U-phase terminal 39 are thus provided as power supply terminals.

Relay terminals 47, 48 and 49 are electrically conductive members provided in correspondence to the W-phase terminal 37, the V-phase terminal 38 and the U-phase terminal 39, respectively. The relay terminals 47, 48 and 49 are formed integrally with the W-phase terminal 37, the V-phase terminal 38 and the U-phase terminal 39, respectively. The relay terminals 47, 48 and 49 are formed of first connection parts 471, 481 and 491 and second connection parts 472, 482 and 492, respectively. The first connection parts 471, 481 and 491 are located coaxially with the W-phase terminal 37, the V-phase terminal 38 and the U-phase terminal 39, respectively. The second connection parts 472, 482 and 492 are bent in radially inward directions from one ends of the first connection parts 471, 481 and 491 in U-shapes, respectively. The second coil part 472, to which the coil end parts 312 and 362 are connected, is provided at a substantially intermediate position of tensile forces of the coils 31 and 36. The second coil part 482, to which the coil end parts 322 and 342 are connected, is provided at a substantially intermediate position of tensile forces of the coils 32 and 34. The second coil part 492, to which the coil end parts 332 and 352 are connected, is provided at substantially intermediate position of tensile forces of the coils 33 and 35. A relation between the second connection part and the coil end part will be described later. The second connection parts 472, 482 and 492 have respective openings 473, 483 and 493, which are formed toward the radially outward directions.

Figure 4:
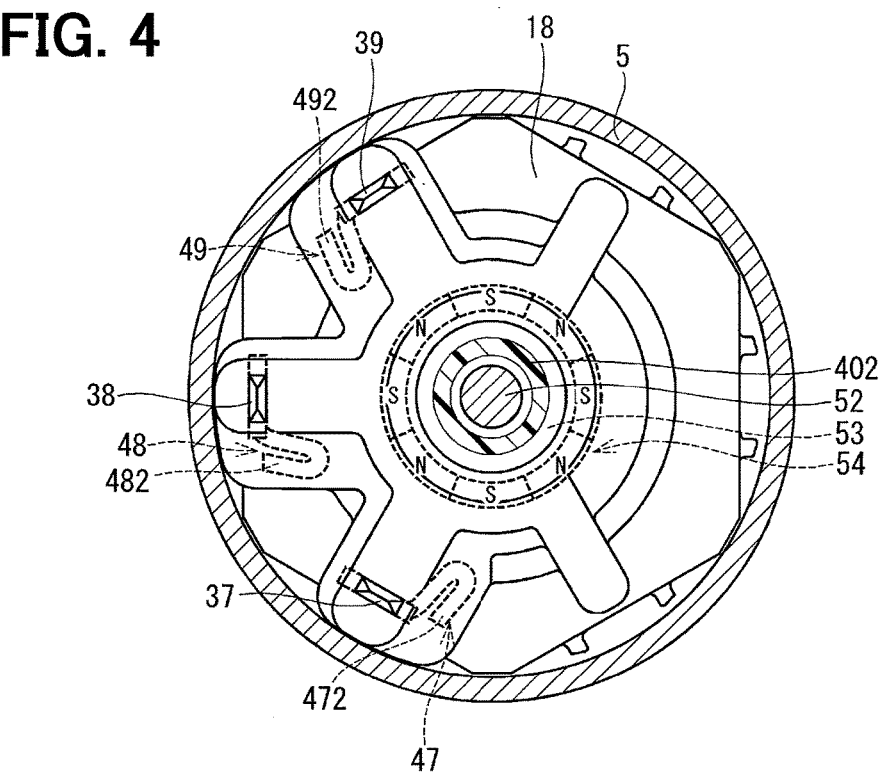
FIG. 4 is a cross-sectional view of the fuel pump taken along a line IV-IV in FIG. 1.

The rotor 50 is housed rotatably inside the stator 10. The rotor 50 is formed of an iron core 53 and permanent magnets 54 provided on the outer circumference of the iron core 53. As shown in FIG. 4, the magnets 54 are magnetized to opposite polarities alternately, that is, magnetized in N-pole and S-pole in the circumferential direction as magnetic poles. In the first embodiment, four pairs of the N-pole and the S-pole, that is, a total of eight poles, are provided. The shaft 52 is press-fitted into an axial hole 51 formed on the central axis of the rotor 50 to be rotated with the rotor 50.

The pump unit 4 will be described next. The pump cover 60 has the inlet port 61, which is tubular and open in the bottom direction in FIG. 1. An inlet passage 62 is formed inside the inlet port 61 to pass through the pump cover 60 in the plate thickness direction. A pump casing 70 is provided in a generally disk shape between the pump cover 60 and the stator 10. A hole 71 informed in the central part of the pump casing 70 to pass through the pump casing 70 in the plate thickness direction. A bearing 56 is fitted in the hole 71. The bearing 56 rotatably supports both axial ends of the shaft 52 co-operatively with the bearing 55 fitted in the end cover 40. The rotor 50 and the shaft 52 thus are rotatable relative to the end cover 40 and the pump casing 70.

An impeller 65 is formed of resin and in a generally disk shape. The impeller 65 is housed in a pump chamber 72 formed between the pump cover 60 and the pump casing 70. An end part of the shaft 52 has at its pump chamber 72 side a D-shape, which is formed by cutting a part of an outer wall. This end part in D-shape is fitted in a hole 65, which is also formed in a D-shape in the central part of the impeller 65 in correspondence to the D-shape of the shaft 52. The impeller 65 is rotated in the pump chamber 72 by rotation of the shaft 52.

A groove 63, which is communicated with the inlet passage 62, is formed on a wall surface of the pump cover 60 facing the impeller 65. A groove 73 is formed on a wall surface of the pump casing 70 facing the impeller 65. A passage 74 is formed to pass through the pump casing 70 in a plate thickness direction and communicated with the groove 73. A vane part 67 is formed on the impeller 65 at positions, which correspond to the groove 63 and the groove 73.

In the fuel pump 1, the impeller 65 rotates with the rotor 50 and the shaft 52 when electric power is supplied to the coils 31, 32, 33, 34, 35 and 36 of the motor unit 3. When the impeller 65 rotates, fuel is introduced from the outside of the fuel pump 1 into the groove 63 through the inlet port 61. The fuel introduced into the groove 63 is pressurized by rotation of the impeller 65 and led into the groove 73. The pressurized fuel flows through the passage 74 and led into the intermediate chamber 75 of the motor unit 3 side in the pump casing 70. The fuel led into the intermediate chamber 75 is forced out to the outlet passage 42 through fuel passages provided in the axial or longitudinal direction in the motor unit 3, and discharged from the outlet port 41.

Two fuel passages are provided in the fuel pump 1. One fuel passage is formed of a passage 76 and a passage 43. The passage 76 is between an outer wall of the rotor 50 and an inner wall of the stator 10. The passage 43 is between an outer wall of the tubular part 402 of the end cover 40 and inner walls of the bobbins 21, 22, 23, 24, 25 and 26. The other fuel passage is between an outer wall of the stator 10 and an inner wall surface of the housing 5.

A sequence of assembling the stator 10, which is performed after winding of coils 31, 32, 33, 34, 35 and 36 about the bobbins 21, 22, 23, 24 and 25, 26 used in the motor unit 3, will be described with reference to FIG. 3 and FIG. 4.

FIG. 3 is a top plan view of the stator 10 and shows a state where the top surface of the stator 10 is not molded by resin 18.

First, the coiled parts 311, 321, 331, 341, 351 and 361 of the coils 31, 32, 33, 34, 35 and 36 are wound, respectively, about the bobbins 21, 22, 23, 24, 25 and 26, in which the cores are insert-molded, respectively. In this process, to prevent the coiled parts 311, 321, 331, 341, 351 and 361 from loosening or collapsing of coiled parts after winding, the coil end parts 312, 322, 332, 342, 352 and 362 are hooked in temporary holding grooves 212, 222, 232, 242, 252 and 262 formed on annular parts 211, 221, 231, 241, 251 and 261 of the bobbins 21, 22, 23, 24, 25 and 26, respectively.

Then the W-phase terminal 37, the V-phase terminal 38 and the U-phase terminal 39 formed integrally with the relay terminals 47, 48 and 49 are press-fitted in the annular parts 211, 221, 231 of the bobbins 21, 22, 23, respectively. Open areas of openings 473, 483, 493 of the second connection parts 472, 482, 492 of the relay terminals 47, 48, 49 are greater than open areas, which are available when power is supplied and crimped. The coil end parts 312, 322, 332, 342, 352 and 362, which are hooked in the temporarily holding grooves 212, 222*l*, 232, 242, 252 and 262 are then hooked to the relay terminals 47, 48 and 49. In this process, the coil end parts 312, 322, 332, 342, 352 and 362 are passed through the openings 473, 483 and 493, that is, inserted into the second connection parts 472, 482 and 492 in a direction from a radially outside toward a radially inside of the second connection parts 472, 482 and 492.

The second connection parts 472, 482 and 492 are deformed to narrow the openings 473, 483 and 493 of the second connection parts 472, 482, and 492, into which the coil end parts 312, 322, 332, 342, 352 and 362 are inserted. The relay terminals 47, 48 and 49 are electrically crimped to connect electrically the coil end parts and the relay terminals. Then the terminals are molded by resin 18 as shown in FIG. 1 or FIG. 4. In this process, the W-phase terminal 37, the V-phase terminal 38 and the U-phase terminal 39 are formed to protrude in the axial or longitudinal direction as shown in FIG. 1. Lastly, the resin mold 18 is shaped by cutting to be housed inside the housing 5. Thus assembling of the stator 10 is completed.

The relay terminals 47, 48 and 49 of the motor unit 3 are provided at positions apart from the inner wall surface of the housing 5. A top surface of a stator 90 of a motor unit 6 according to a comparative example is shown in FIG. 6. In the stator 90, relay terminals 97, 98 and 99 connected to a W-phase terminal 87, a V-phase terminal 88 and a U-phase terminal 89 are provided radially outside the W-phase terminal 87, the V-phase terminal 88 and the U-phase terminal 89, respectively. In the example, distances between the inner wall surface of the housing 7, in which the stator 80 is housed, and the relay terminals 97, 98 and 99 are shorter than the distances between the inner wall surface of the housing 5 of the motor unit 3 in the first embodiment shown in FIG. 4 and the relay terminals 47, 48 and 49. It is therefore harder, according to the stator 90 of the comparative example, to maintain the insulation between the inner wall surface of the housing 7 and the relay terminals 97, 98 and 99. According to the stator 10 of the motor unit 3 of the first embodiment, it is possible to surely maintain the insulated state since the distances between the inner wall surface of the housing 5 and the relay terminals 47, 48 and 49 are longer. Thus the relay terminals 47, 48 and 49 are protected from breaking due to discharging with the housing 5.

According to the stator 10 of the motor unit 3, the relay terminals 47, 48 and 49 and the coil end parts 312, 322, 332, 342, 352 and 362 are connected at positions radially inside the W-phase terminal 37, the V-phase terminal 38 and the U-phase terminal 39. Thus tensile force, which the coils 31, 32, 33, 34, 35 and 36 exert on the relay terminals 47, 48 and 49, can be divided. This advantage will be described with reference to FIG. 5. Here, description will be made about the relay terminal 48 connected to the V-phase terminal 38. The same description will be made about the relay terminals 47 and 49.

Figure 5:
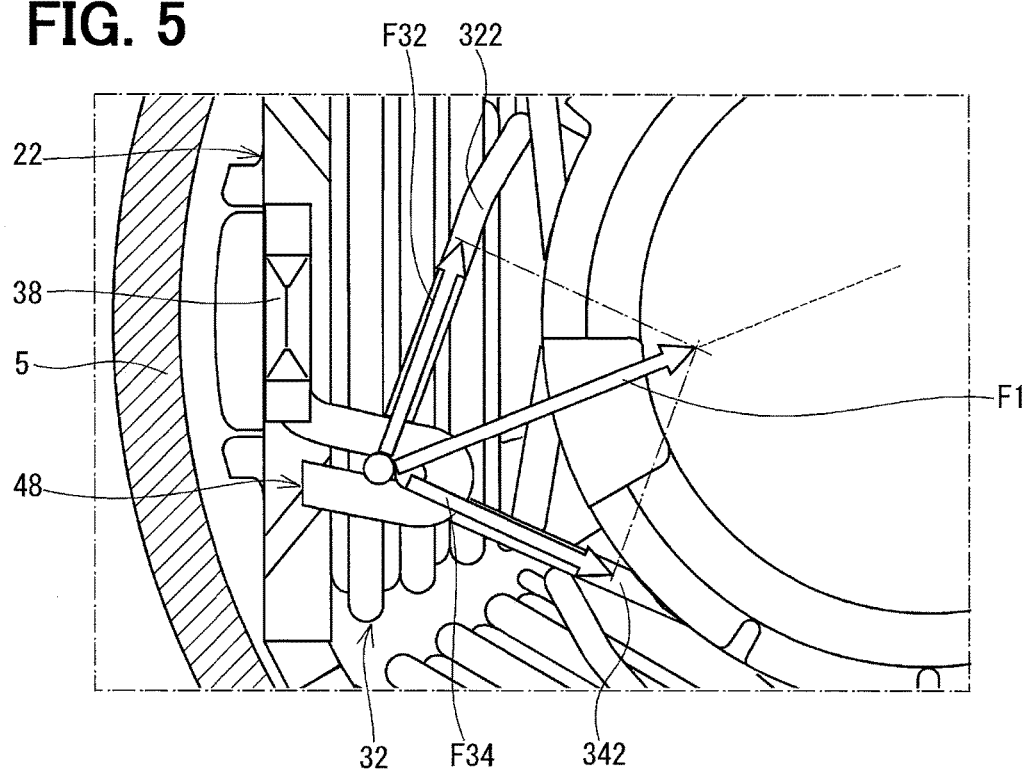
FIG. 5 is an enlarged view of a part V in FIG. 3.

The tensile forces, which the coil end parts 322 and 342 of the coils 32 and 34 exert on the relay terminal 48, are assumed to be F32 and F34 as shown in FIG. 5. A resultant force of those tensile forces in the radially inward direction is assumed to be F1 as shown in FIG. 5.

In the comparative example, in which the relay terminal is provided radially outside the power supply terminal, the resultant force of the tensile forces in the radially inward direction, which the coils exert on the relay terminal, is greater than the resultant force F1. The power supply terminal and the relay terminal of the motor unit according to the comparative example is shown in enlargement in FIG. 6. In the comparative example, the tensile forces, which the coil end parts 922 and 942 exert on the relay terminal 98, are assumed to be F92 and F94, which are equal to the tensile forces F32 and F34 of the first embodiment. The resultant force of those tensile forces F92 and F94 in the radially inward direction is F2.

As described above, in the stator 10 of the motor unit 3 according to the first embodiment, the relay terminals 47, 48 and 49 are provided radially inside the W-phase terminal 37, the V-phase terminal 38 and the U-phase terminal 39, respectively. As a result, the tensile forces, which the coils 31, 32, 33, 34, 35 and 36 exert on the relay terminals 47, 48 and 49, are divided. The resultant force of forces, which the plural coils exert on the relay terminals 47, 48 and 49 in the radially inward direction, is more reduced than in a motor, in which the relay terminals are not provided radially inside. It is thus possible to protect the relay terminals 47, 48, 49 and the W-phase terminal 37, the V-phase terminal 38, the U-phase terminal 39 from deforming or breaking.

The openings 473, 483 and 493 of the second connection parts 472, 482 and 492 of the relay terminals 47, 48 and 49 are formed to open in the radially outward direction. Since the tensile forces of the coils 31, 32, 33, 34, 35 and 36 exert on the second connection parts 472, 482 and 492 in the radially inward direction, the coil end parts 312, 322, 332, 342, 352 and 362 are restricted from disengaging from the second connection parts 472, 482 and 492 when the coil end parts 312, 322, 332, 342, 352 and 362 are hooked to the second connection parts 472, 482 and 492. Thus, in manufacturing the stator 10, the coil end parts 312, 322, 332, 342, 352 and 362 can be easily inserted into the second connection parts 472, 482 and 492 and can be maintained in the hooked state surely.

Second Embodiment

A brushless motor according to a second embodiment will be described with reference to FIG. 8 to FIG. 11. The second embodiment is different from the first embodiment in respect of shapes of power supply terminals. Substantially the same parts as in the first embodiment are designated by the same reference numerals to simplify the description.

Figure 8:
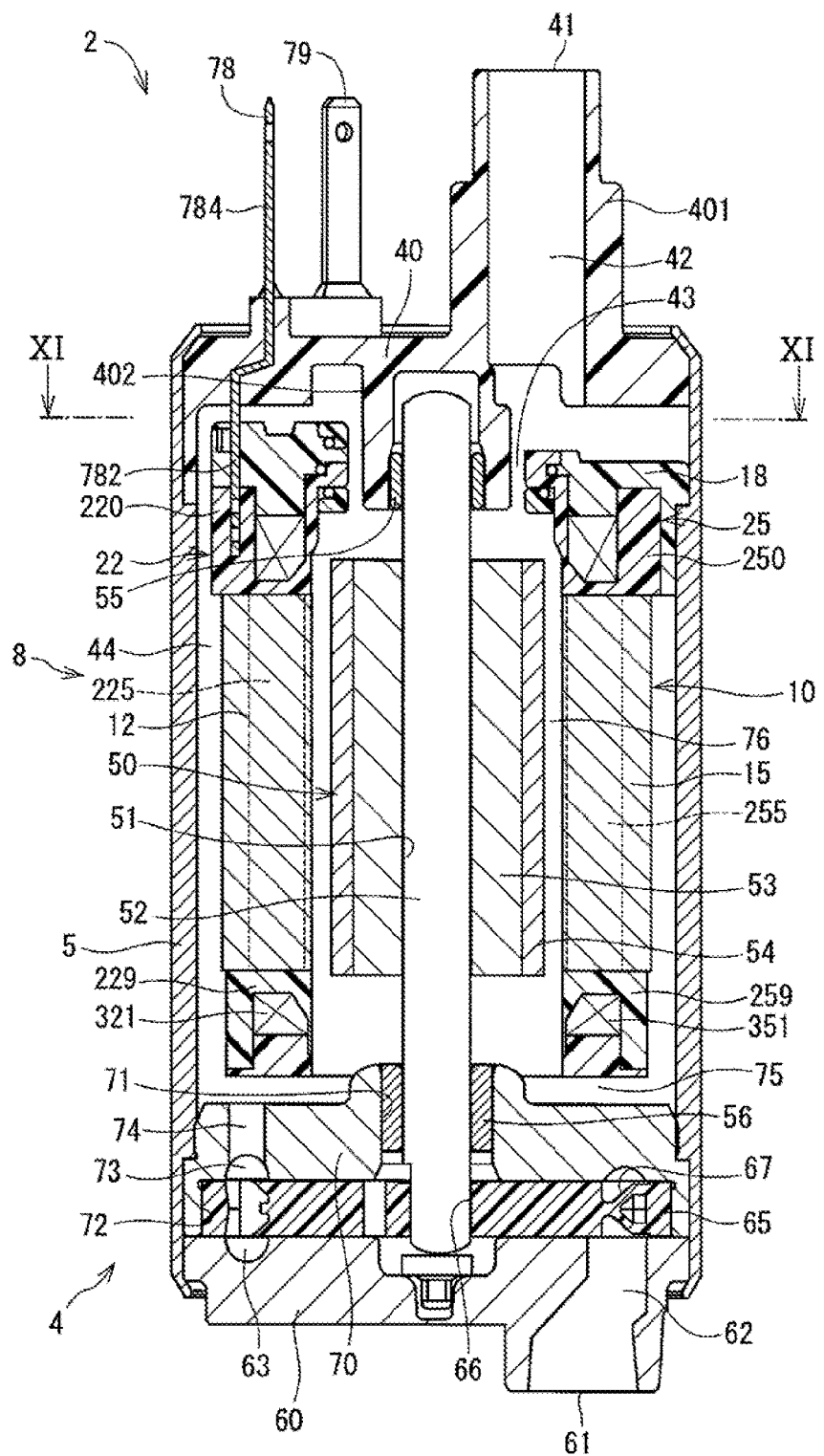
FIG. 8 is a cross-sectional view of a fuel pump using a brushless motor according to a second embodiment.
Figure 10:
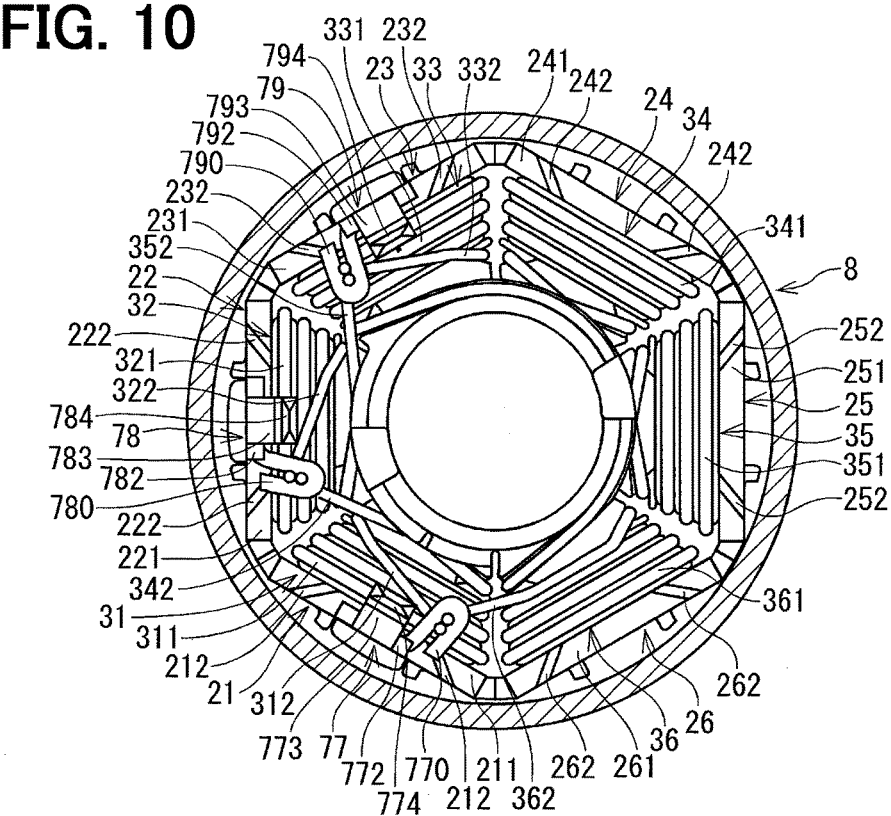
FIG. 10 is a top plan view of a stator of the brushless motor according to the second embodiment.

A fuel pump 2 using a motor unit 8, which is a brushless motor, according to a second embodiment is shown in cross-section in FIG. 8. In the motor unit 8, as shown in FIG. 10, the W-phase terminal and the relay terminal are integrated as a W-phase connection terminal 77, the V-phase terminal and the relay terminal are integrated as a V-phase terminal 78, and the U-phase terminal and the relay terminal are integrated as a U-phase connection terminal 79. These terminals 77, 78 and 79 are provided as power supply terminals and bent partly.

Figure 9A:
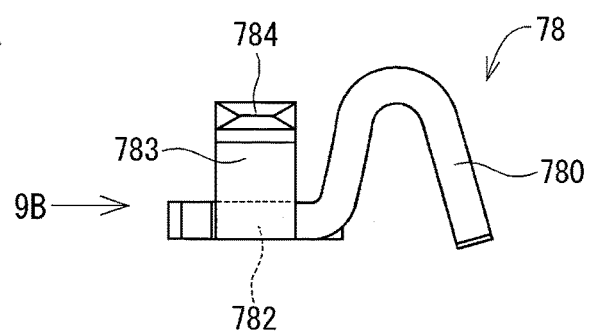
FIG. 9A and FIG. 9B are a top plan view and a side view of a connection terminal of the brushless motor according to the second embodiment.
Figure 9B:
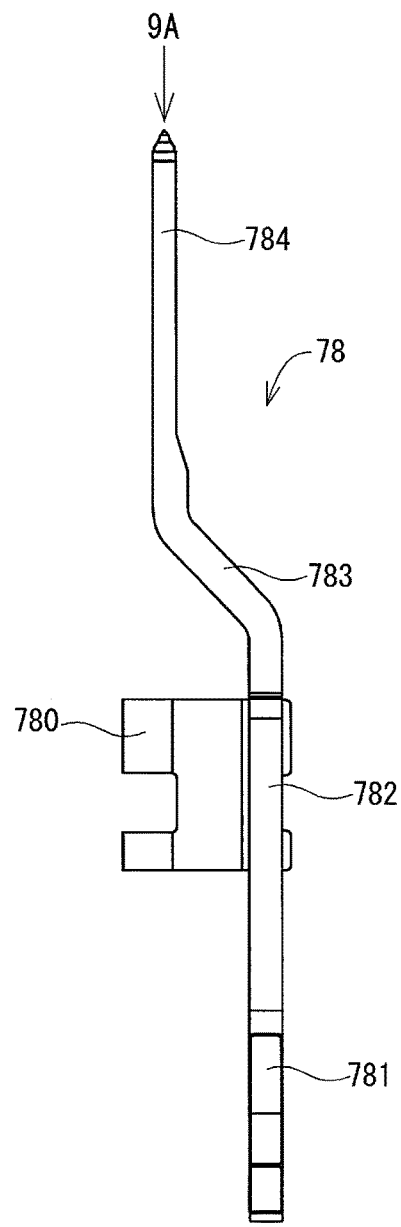

The shape of the connection terminal of the motor unit 8 will be described with reference to FIG. 9A, FIG. 9B and FIG. 10. FIG. 9A is a top plan view of the V-phase connection terminal 78 and shows a state, which is viewed from the top part in FIG. 8 under a state that the motor unit 8 is assembled as a part of the fuel pump 2. FIG. 9B shows the V-phase connection terminal 78 taken in a direction 9B in FIG. 9B. Although not shown in those figures, the W-phase connection terminal 77 and the U-phase connection terminal 79 are formed in the similar shape.

The V-phase connection terminal 78 includes a press-fit part 781, a first relay terminal part 782, a second relay terminal part 780, a bent part 783 and a connector connection part 784. The press-fit part 781, the first relay terminal part 782, the second relay terminal part 780, the bent part 783 and the connector connection part 784 are formed integrally as a conductive member.

The press-fit part 781 is formed in a straight shape and press-fitted into the annular part 221 of the bobbin 22.

The first relay terminal 782 is connected to an end part, which is opposite to an end part fitted into the annular part 221 of the press-fit part 781. The first relay terminal part 782 is connected to the second relay terminal part 780, which is formed in a U-shape protruding substantially perpendicularly to a longitudinal direction of the V-phase connection terminal 78. When the V-phase connection terminal 78 is press-fitted into the annular part 221 of the bobbin 22, the second relay terminal part 780 is located more radially inside of the motor unit 8 than the press-fit part 781. Similarly to the motor unit 3 according to the first embodiment, the second relay terminal part 780 is connected electrically to the coil end parts 322 and 342 of the coils 32 and 34. The first relay terminal part 782 is a relay terminal as well as a first connection part. The second relay terminal part 780 is also a relay terminal as well as a second connection part.

The bent part 783 is connected to an end part, which is opposite to the end part connected to the press-fit part 781 of the first relay terminal part 782. The bent part 783 is formed in a direction, in which the second relay terminal part 780 protrudes. That is, the bent part 783 is formed to extend in the radially inward direction of the motor unit 8 when the V-phase connection terminal 78 is press-fitted into the annular part 221 of the bobbin 22. The bent part 783 is a power supply terminal.

The connector connection part 784 is connected to an end, which is opposite to the end connected to the first relay terminal part of the bent part 783. The connector connection part 784 is formed in a straight shape. The connector connection part 784 is located more radially inside of the motor unit 8 than the first relay terminal part 784 as shown in FIG. 10, when the V-phase connection terminal 78 is press-fitted into the annular part 221 of the bobbin 22. The connector connection part 784 is also a power supply terminal.

In the brushless motor according to the second embodiment, the second relay terminal parts 770, 780 and 790 of the W-phase connection terminal 77, the V-phase connection terminal 78 and the U-phase connection terminal 79, which are connected to the coil end parts 312, 322, 332, 342, 352 and 362 are located radially inside of the annular parts 211, 221 and 231 of the bobbins 21, 22 and 23, respectively. As a result, the distances between the second relay terminal parts 770, 780, 790 and the inside wall surface of the housing 5 are increased so that the motor unit 8 provides the same advantage as the motor unit 3 according to the first embodiment.

The connection parts 774, 784 and 794 of the W-phase connection terminal 77, the V-phase connection terminal 78 and the U-phase connection terminal 79 are located at more outlet port 41 side of the coils 31, 32, 33, 34, 35 and 36 by the bent parts 773, 783 and 793 connected to the first relay terminal parts 772, 782 and 792 and radially inside. Thus the outer diameter of the top part of the fuel pump 2 can be sized smaller than the outer diameter of the housing 5 without interference of the connector connection parts 774, 784 and 794 with the coils 31, 32, 33, 34, 35 and 36. Since the connector connection parts 774, 784 and 794 are located radially inside the motor 8, the maximum outer diameter of the fuel pump 2 can be made equal to the maximum outer diameter of the housing 5 when an external connector is connected. Thus the fuel pump 2 can be pushed in or pulled out of the fuel pump module with the external connector being held connected. As a result, in assembling the fuel pump module, the order of assembling the fuel pump 2 and the external connector can be determined freely.

Figure 11:
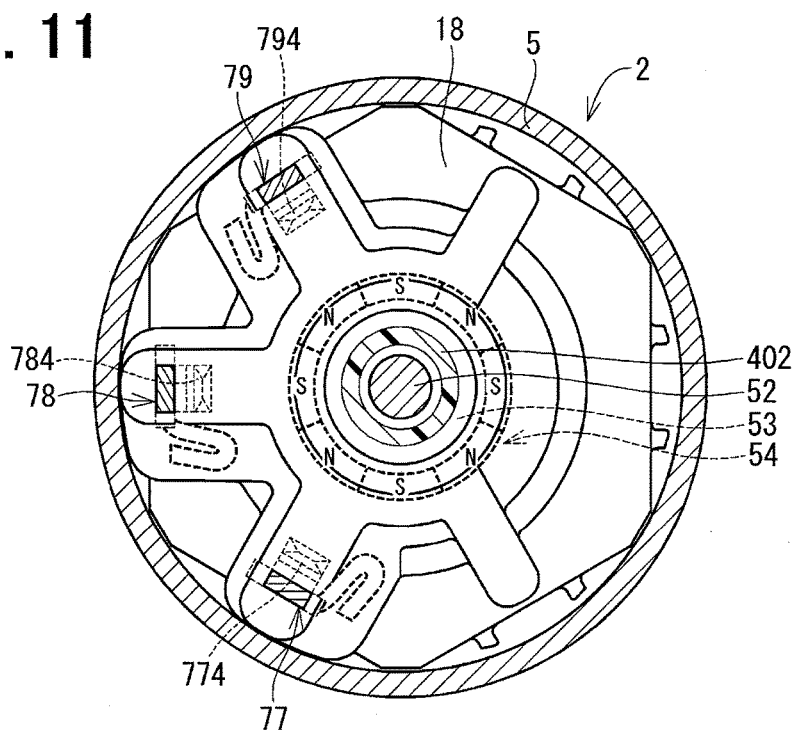
FIG. 11 is a cross-sectional view of the fuel pump taken along a line XI-XI in FIG. 8.

Further, as shown in FIG. 11, the connector connection parts 774, 784 and 794 are provided at positions more distanced from the inside wall surface of the housing 5. It is thus possible to use an external connector having thick walls, for example, a water-proof connector using a rubber material.

The W-phase connection terminal 77, the V-phase connection terminal 78 and the U-phase connection terminal 79 have respective bent parts 773, 783 and 793, which extend in the radially inward directions. Thus the W-phase connection terminal 77, the V-phase connection terminal 78 can be increased more in strength.

In the processing of assembling the motor unit 8, the second relay terminal parts 770, 780, 790 and the coiled parts 312, 322, 332, 342, 352, 362 are connected by fusing. In this case, parts of the second relay terminal parts 770, 780, 790 or the coil parts 312, 322, 332, 342, 352, 362 melted out by fusing are scattered as foreign particles around the second relay terminal parts 770, 780, 790. In the motor unit 8 according to the second embodiment, the foreign particles scattered from the second relay terminal parts 770, 780 and 790 adhere to the bent parts 773, 783 and 793 before reaching the connector connection end parts 774, 784 and 794. Thus the bent parts 773, 783 and 793 protect the connector connection parts 774, 784 and 794 from being stained by the foreign particles. It is therefore possible to prevent imperfect electric conduction between the connector connection parts 774, 784 and 794 and the external connector by the foreign particles generated at the time of fusing.

OTHER EMBODIMENTS (A) According to the above-described embodiment, the relay terminal is formed integrally with the power supply terminal. The relay terminal is not limited to such a state. It may be formed as a separate member from the power supply terminal. In this instance, the relay terminal is fixed together with the power supply terminal when the power supply terminal is press-fitted into the annular part of the bobbin.

(B) According to the first embodiment, the second connection part of the relay terminal is formed in the U-shape. According to the second embodiment, the second relay terminal part is formed in the U-shape. However, the second connection part and the second relay terminal part are not limited to such configurations. It is only necessary that these are provided radially inside the motor unit.

The brushless motor is not limited to the above-described embodiments but may be implemented in different ways.

What is claimed is:

1. A brushless motor comprising:
    a stator including a plurality of stator cores formed of a magnetic material, a plurality of stator coils wound about the stator cores, a plurality of bobbins covering the stator cores to insulate the stator coils from the stator cores, power supply terminals provided radially outside the bobbins to receive electric power from an external side, and relay terminals connecting electrically the power supply terminals and the stator coils, the stator generating a rotating magnetic field when power supply to the stator coils is controlled; and
    a rotor provided radially inside the stator and magnetized to opposite magnetic poles alternately in a circumferential direction to be rotated by the rotating magnetic field generated by the stator,
    wherein the relay terminals include, respectively, first connection parts, which are connected electrically to the power supply terminals, and second connection parts, which are connected electrically to the first connection parts and the stator coils,
    wherein each of the second connection parts is provided radially inside the power supply terminal, formed in a U-shape opening in a radially outward direction, and provided at a position adjacent to the power terminals in a circumferential direction, and
    wherein each of the second connection parts is connected electrically within the respective U-shaped opening to a corresponding coil of the plurality of stator coils at a coil end of the corresponding coil, and each of the second connection parts in connected electrically within the respective U-shaped opening to another corresponding coil of the plurality of stator coils at a coil end of the other corresponding coil, and the corresponding coil and the other corresponding coil extend in different directions from the respective U-shape opening.

2. The brushless motor according to claim 1, wherein:
    each of the second connection parts is provided at a position, to which tensile forces of at least two of the stator coils are exerted and at which a resultant force of the tensile forces in a radially inward direction is reduced.

3. The brushless motor according to claim 2, wherein:
    the relay terminals are formed integrally with the power supply terminals, respectively.

4. The brushless motor according to claim 2, wherein:
    the power supply terminal includes a connector connection part, which is connectable to an external connector and located radially inside the first connection part.

5. The brushless motor according to claim 1, wherein:
    the relay terminals are formed integrally with the power supply terminals, respectively.

6. The brushless motor according to claim 1, wherein:
    the power supply terminal includes a connector connection part, which is connectable to an external connector and located radially inside the first connection part.

7. A fuel pump for suctioning fuel in a fuel tank mounted in a vehicle and discharging the fuel, the fuel pump comprising:
    the brushless motor according to claim 1;
    a pump unit including a rotary member, which is coupled to the rotor of the motor to pressurize the fuel;
    an inlet port for introducing the fuel from the fuel tank into the pump unit; and
    an outlet port for outwardly discharging the fuel pressurized by the pump unit.

8. The brushless motor according to claim 1, wherein:
    the relay terminals are formed integrally with the power supply terminals, respectively; and
    the power supply terminal includes a connector connection part, which is connectable to an external connector and located radially inside the first connection part.

9. The brushless motor according to claim 1, wherein:
    each of the second connection parts is provided at a substantially intermediate position of tensile forces of the corresponding coil and the other corresponding coil.

10. The brushless motor according to claim 1, wherein:
    the first connection part does not block the U-shape opening.

11. The brushless motor according to claim 1, wherein each of the second connection parts connects two coil ends of the plurality of stator coils within the U-shape opening.

* * * * *